United States Patent [19]

Lochman et al.

[11] 4,238,588

[45] Dec. 9, 1980

[54] METHOD FOR THE PREPARATION OF POLYMERS AND COPOLYMERS OF VINYL MONOMERS BY ANIONIC POLYMERIZATION

[75] Inventors: Lubomir Lochman; Jiri Trekoval, both of Prague, Czechoslovakia

[73] Assignee: Ceskoslovenska akademie ved, Prague, Czechoslovakia

[21] Appl. No.: 970,987

[22] Filed: Dec. 19, 1978

[30] Foreign Application Priority Data

Dec. 29, 1977 [CS] Czechoslovakia ............... 8999-77

[51] Int. Cl.$^3$ .................. C08F 4/46; C08F 4/48; C08F 4/56; C08F 4/58
[52] U.S. Cl. .................. 526/217; 525/259; 525/267; 526/174; 526/175; 526/178
[58] Field of Search ............. 526/174, 175, 178, 217; 525/259, 267

[56] References Cited

U.S. PATENT DOCUMENTS

| | | | |
|---|---|---|---|
| 3,240,772 | 3/1966 | Natta et al. | 526/180 |
| 3,285,894 | 11/1966 | Lim et al. | 526/175 |
| 4,056,580 | 11/1977 | Lochmann et al. | 526/174 |
| 4,104,465 | 8/1978 | Halasa | 526/174 |

FOREIGN PATENT DOCUMENTS 2449784 4/1976 Fed. Rep. of Germany ........... 526/180

OTHER PUBLICATIONS

Chem. Abstracts, vol. 81, pp. 119311; 119288 n, Caubere, 1974.

*Primary Examiner*—William F. Hamrock

[57] ABSTRACT

The invention pertains to a method for preparation of polymers, grafted polymers, and copolymers from olefins substituted by polar groups (ester, nitrile, or aryl) or from dienes, wherein the polymerization is initiated by the system formed by mixing of an organic amide of alkaline metal with an alkaline metal alkoxide. The organic amide is derived from primary or secondary amines or polyamines, or from tertiary polyamines containing at least one primary or secondary amino group. These amines contain N-C or N-Si bonds, 1-4000 C atoms and 1-1000 N atoms in a molecule, or have the molecular weight below 100,000. The alkoxides are derived from $C_3$-$C_{16}$ alcohols. The polymerizations are carried out at $-80°$ to $+80°$ C. (advantageously at $+20°$ C.), at the monomer/organic amide molar ratio 5-1500, at the molar ratio alkoxide/amide 0.5-10, and in hydrocarbon or ether solvents. The advantage of organic amides of alkaline metals is the easy and economical preparation and suitable physical and chemical properties (solubility, higher resistance to contamination), while the alkoxide component exhibits the superadditive effect on the polymerization rate and yield and affects the microstructure of polymer. The method is also suitable for preparation of block copolymers by successive addition of various monomers, block copolymers with polyamine blocks, and grafted polyamine polymers.

7 Claims, No Drawings

METHOD FOR THE PREPARATION OF POLYMERS AND COPOLYMERS OF VINYL MONOMERS BY ANIONIC POLYMERIZATION

The invention relates to a method for the preparation of polymers and copolymers of vinyl monomers by anionic polymerization.

To generate a growth center in the anionic polymerization of vinyl monomers, strongly basic organic compounds are used, which contain an alkaline metal bonded to a carbon, nitrogen, or oxygen atom. Till the present time, the attention has been mostly paid to the initiators of polymerization containing a bond carbon-metal or oxygen-metal; (see, for example, the U.S. Pat. No. 4,056,580 D. M. Wiles, S. Bywater; Polymer 1962 3, 175; D. M. Wiles, S. Bywater: Trans. Faraday Soc. 1965, 61, 150; D. Lim, J. Trekoval: Czechoslovak Pat. No. 112,248; J. Trekoval, D. Lim: J. Polymer Sci., Part C, 1963, 4 333). On the contrary, the compounds containing a bond nitrogen-metal has been used for these purpose only seldom, which fact applies to the organic amides of alkaline metals of the general formula RR'N-M, where M is Li, Na, or K, and R, R' are organic substituents. However, the organic amides of alkaline metals exhibit some properties fairly convenient from the standpoint of their application as polymerization initiators. In the first place, it is their easy and economical preparation, which requires the consumption of only about one half of the alkaline metal in comparison with the preparation of organometallic compounds based on the reaction of alkyl halides with the metal. It has been further found that some readily accessible sodium or potassium amides exhibit convenient physical properties, as solubility in nonpolar solvents, which fact is important in their application as initiators. Eventually, organic amides of alkaline metals are generally less sensitive to some components of atmosphere than other organometallic compounds and, consequently, their contamination by air oxygen or water is less possible. Recently, some polymerizations were carried out under initiation with lithium diethylamide (A. C. Angood, S. A. Hurley, P. J. T. Tait; J. Polymer Sci., Polymer Chem. Edit. 1973, 11, 2777; ibid. 1975, 13, 2437; and S. A. Hurley, P. I. T. Tait: ibid. 1976, 14, 1565). Even when the formation of polymers was observed in some of these experiments, either their yields were low after long reaction periods (rather exceeding 24 hours) or the addition of solvents which provide the solvation was necessary.

Now, it has been found, that the initiation properties of organic amides of alkaline metals considerably improve if these amides are used for polymerization in the presence of alkaline metal alkoxides. The analysis of a model mixture of amides and alkoxides revealed that several reactions proceed in this system, depending on the conditions, and that some of them activate the organic amide so that the initiation proceeds easier. Another favourable effect perform the alkoxides on propagation reaction of some monomers.

The invention pertains to a method for the preparation of polymers and copolymers from the monomers based on olefins substituted by polar groups, selected from the group comprising ester, nitrile, and aryl groups, or based on dienes, which method consists in the application of the system formed by mixing of an organic amide of lithium, sodium, or potassium with an alkoxide of the same or another alkaline metal, for the initiation of polymerization, grafting polymerization, or copolymerization. The employed organic amide of alkaline metal is derived from a primary or secondary amine or polyamine, or from a tertiary polyamine which, however, contains at least one primary or secondary amino group, which has its nitrogen atoms bonded with carbon atoms and/or silicon atoms and contains 1 to 4000 carbon atoms and 1 to 1000 nitrogen atoms in a molecule, or which has the molecular weight below 100,000. The employed alkaline metal alkoxide is derived from an alcohol with the straight, branched, or cyclic chain of 3 to 16 carbon atoms. The alkaline metal alkoxide is used in an alcohol-free form. The polymerization, the grafting polymerization, or the copolymerization is carried out at temperatures from $-80°$ C. to $+80°$ C., advantageously at $+20°$ C., while the molar ratio of the monomer and the organic amide of alkaline metal is 5 to 1500 and the molar ration of the alkaline metal alkoxide and the organic amide of alkaline metal is 0.5 to 10. The alkaline metal alkoxide or its part may be mixed with the monomer or a mixture of monomers before the addition of the organic amide of alkaline metal to the polymerization mixture. The polymerization can be also carried out in such a way, that the monomer or a mixture of monomers is gradually added in parts to the initiator, i.e. to the system formed by mixing of the organic amide of alkaline metal with the alkaline metal alkoxide. In the block copolymerization, second monomer is added into the polymerization mixture first after the first monomer was completely polymerized by the initiation system prepared according to this invention, while different monomers are used which have the same polymerizability or which are added in the order of the increasing polymerizability by anionic initiators. Another method of polymerization consists in addition of a solution of the aforesaid initiator in one or several portions to a solution of the monomer or a mixture of monomers. Aliphatic, cycloaliphatic, or aromatic hydrocarbons and/or organic ether or mixtures thereof are used as solvents in these polymerizations.

The advantages of the aforesaid initiation system consist in the combination of the utility of organic amides of alkaline metals for the initiation of polymerizationm as are their above mentioned chemical and physical properties or their easy preparation, with the superadditive and modification effect of alkaline metal alkoxides. Thus, for example, the organic amides of alkaline metal are generally more suitable for the initiation of polymerization of methacrylic esters than are organometallic compounds of the butyllithium type as follows from the given comparison of methyl methacrylate polymerization in toluene (0.63 mol/l) at $+20°$ C. and the concentration of initiators 0.0052 mol./l. The yields of polymer obtained were 12, 54 and 70% with butyllithium, lithium diisopropylamide, and lithium diisopropylamide—lithium tert-butoxide system, respectively. In addition to the superadditive effect of alkoxide, which increases with the increasing value of alkoxide/amide rating it is also possible to achieve variations of polymer microstructure by a suitable combination of amide and alkoxide and to modify, in this way, the properties of the resulting polymer.

Another advantage of the aforesaid initiation system consists in obtaining high yields of poly/methyl methacrylate) at the temperature as high as $+20°$ C., so that it is not necessary to carry out polymerizations at deep temperatures. The polymerization proceeds by high rate and the prevailing part of monomer reacts within several minutes at a given temperature. These initiators are therefore especially suited for a continuous polymerization of methacrylate esters. Similarly, even other monomers may be polymerized under more convenient conditions, if the polymerization is initiated by organic amides of alkaline metals in the presence of alkaline metal alkoxides. Di- and polyfunctional initiators can be easily prepared by multiple metallation of polyamines and are suitable for the preparation of special polymers and copolymers.

The properties of polymers obtained by means of the aforesaid initiation systems depend on the molar ratio of the monomer [M] and the initiator [I]. If this ratio [M]/[I] is high, the physical properties of materials prepared also with other anionic initiators and the advantage of the new initiation system consists above all in the improved economy of process and also in the possible modification of polymer microstructures. However, if the aforesaid ratio is low, e.g. equal to 10, the effect of amino groups incorporated into the polymer chain during initiation manifests itself strongly in the physical and chemical properties of polymer, especially if polyamine was used in the preparation of initiatior. In this case, block copolymers are obtained by a simple way with polyamine as one of the blocks. Their properties are then generally determined by the character of block copolymers, i.e. by the sum of properties of individual homopolymers. These copolymers may find a fairly broad application both in the macromolecular technology for preparation of polymer blends and in other fields, as e.g. in medicine as polymers with hydrophilic properties and with reactive groups (e.g. as carriers of pharmaceutics), in the textile industry for cotton and cellulose fibers finish, in paper industry during working of paper pulp and paper manufacturing, in the gas technology as a special sorbent of acid gases, or as emulsifiers or additives of lubricating oils. All polymers containing nitrogen atoms from organic amides of alkaline metals, with either high or low content of amine groups, may be modified by the chemical reaction with a suitable reactive low-molecular- or high-molecular-weight compound and in this polymers with the required different properties can be easily obtained.

Raw materials necessary for the preparation of the aforesaid initiation mixtures are readily available. Organic amides of alkaline metals and alkaline metal alkoxides may be mostly obtained by a single-step synthesis from amine (or alcohol) and the corresponding metal in a hydrocarbon medium in the presence of an activator by a simple operation. Stoichiometry of these reactions enables the higher utilization of alkaline metal than it is in the reactions of alkyl halides and this difference is particularly important for expensive lithium.

EXAMPLE

All operations with organic compounds and alkaline metals were carried out under the protective atmosphere, e.g. under nitrogen or argon. Monomers and solvents were dried by calcium hydride or by sodium ketyl. The polymerizations were stopped by addition of methanol and the resulting polymer was isolated mostly by precipitation into petroleum ether or methanol.

EXAMPLE 1

A polymerization vessel was charged with 49.2 ml of toluene and 0.0343 mol of methyl methacrylate (MMA). The initiator, prepared by mixing of 0.000286 mol of lithium diisopropylamide (LiA), 0.000858 mol of lithium tert-butoxide, and 1.8 ml of toluene, was added under stirring at 20° C. After 1 hour of agitation, the polymer was isolated in the yield of 70%. The parallel experiment carried out under the same conditions, but without alkoxide, have the yield of poly/methyl methacrylate) (PMMA) of only 54%.

EXAMPLE 2

Similarly as in Example 1, the charge was 49.2 ml of toluene and 0.0343 mol of MMA. The initiator from 0.000286 mol of LiA, 0.000286 mol of sodium tert-butoxide, and 1.76 ml of toluene was added under stirring at 20° C. The polymer was isolated after 1 hour, the yield was 81% of PMMA (without alkoxide only 54%).

EXAMPLE 3

Similarly as in Example 1, the charge was 48.0 ml of toluene and 0.00343 mol of MMA. The initiator from 0.000143 mol of LiA, 0.000429 mol of sodium tert-butoxide, and 2.95 ml of toluene was added under stirring at 20° C. The polymer was isolated after 1 hour; the yield was 67% of PMMA.

EXAMPLE 4

Similarly as in Example 1, the charge was 48.0 ml of toluene, 0.0343 mol of MMA, and the solution of 0.000429 mol of sodium tert-butoxide in 2.0 ml of toluene. After 5 minutes, the solution of 0.000143 mol of LiA in 0.85 ml of toluene was added under stirring at 20° C. PMMA was isolated after 1 hour in the yield of 50%.

EXAMPLE 5

Similarly as in Example 1, the charge was 49.2 ml of toluene and 0.0343 mol of MMA. The initiator prepared from 0.000286 mol of sodium hexamethyldisilazane, 0.000286 mol of sodium tert-butoxide, and 1.75 ml of toluene was added under stirring at 20° C. PMMA was isolated after 1 hour in the yield of 89.5% and had the following characteristics: $\overline{M}_w = 55,000$; $\overline{M}_n = 31,500$; $\overline{M}_w/\overline{M}_n = 1.75$; the microstructure I 33%, H 42%, S 25%. In the parallel experiment carried out in the absence of sodium tert-butoxide, PMMA was obtained in the yield of only 73% and showed $M_w = 35,000$; $\overline{M}_n = 24,500$; $\overline{M}_w/\overline{M}_n = 1.47$; the microstructure I 41%, H 48%, S 11%.

EXAMPLE 6

Similarly as in Example 1, the charge was 49.2 ml of toluene and 0.0343 mol of MMA. The initiator prepared from 0.000143 mol of potassium hexamethyldisilazane, 0.000143 mol of potassium tert-butoxide, and 1.75 ml of toluene was added under stirring at 20° C. The polymer was isolated after 1 hour in the yield of 80.5% and has the microstructure I 35%, H 46%, S 19%. From the parallel experiment which was carried out in the absence of alkoxide, the obtained yield of PMMA was only 57% and the polymer had the microstructure I 31.5%, H 50.5%, S 18%.

EXAMPLE 7

Similarly as in Example 1, 57 ml of toluene, 0.00837 mol of lithium tert-butoxide, 0.00418 mol of triethylenetetramine, and 0.00418 mol of butyllithium (in the form of approximately 1 molar benzene solution) were mixed. After 3 minutes of stirring, 0.0418 mol of MMA was added and after 1 hour of stirring, poly(methyl methacrylate) with built-in triethylenetetramine was isolated in the yield of 57% (calculated on the monomer). The yield of polymer was only 30% in the parallel experiment which was carried out in the absence of alkoxide.

EXAMPLE 8

Similarly as in Example 1, the charge was 43.3 ml of toluene, 0.0960 mol of styrene, and 0.00320 mol of potassium tert-butoxide. At 20° C., 5.35 ml of 0.60 molar toluene solution of LiA was added under stirring. Polystyrene was isolated after 22 hours in the yield of 60%. No polymer was obtained in the parallel experiment, which was carried out without alkoxide.

EXAMPLE 9

Similarly as in Example 1, the charge consisted of 44.8 ml of toluene, 0.0960 mol of isoprene, and 0.000320 mol of potassium tert-butoxide and 5.35 ml of the 0.60 molar toluene solution of LiA was added to this mixture at 20° C. under stirring. Polyisoprene was isolated in the yield of 31% after 8 hours of agitation. No polymer was obtained in the parallel experiment, which was carried out in the absence of alkoxide.

EXAMPLE 10

Similarly as in Example 1, the charge consisted of 44.6 ml of toluene formed by mixing of 0.00343 mol triethylenetetramine, 0.0103 mol of lithium tert-butoxide, and 0.00343 mol of n-butyllithium. After 5 minutes, 0.0343 mol of n-butyl methacrylate was added at 20° C. under stirring and the mixture was allowed to polymerize for 1 hour. The yield of polymer was 84.1%.

EXAMPLE 11

Similarly as in Example 1, the charge contained 49.2 ml of toluene and 0.0343 mol of MMA. The initiator prepared by mixing of 0.000286 mol of LiA, 0.000286 mol of potassium (-)-methoxide, and 1.76 ml of benzene was added at 20° C. under stirring. The polymer was isolated after 1 hour in the yield of 48%.

EXAMPLE 12

Similarly as in Example 1, the charge consisted of 48.2 ml of toluene and 0.0343 mol of MMA. The initiator prepared from 0.000286 mol of LiA, 0.00172 mol of sodium tert-butoxide, and 2.8 ml of benzene was added at 20° C. under stirring. After 4 minutes, 0.0343 mol of n-butyl methacrylate was added and the mixture was allowed to react for 1 hour. The block copolymer poly/methyl methacrylate -b- n-butyl methacrylate) was then isolated in the yield of 71%.

EXAMPLE 13

Similarly as in Example 1, the charge contained 55 ml of tetrahydrofuran, 45 ml of benzene, 4.3 g of polyethyleneimine (mol. wt. 45,000; theoretical content of —NH- groups 0.1 mol), 0.005 mol of n-butyllithium, and 0.025 mol of lithium tert-butoxide. After the completed reaction of this mixture, 0.050 mol of MMA was added and allowed to polymerize for 14 hours. Grafted polyethyleneimine was obtained in the yield of 6.0 g.

EXAMPLE 14

Similarly as in Example 1, the charge consisted of 45.9 ml of toluene, 0.0343 mol of acrylonitrile and the initiator prepared from 0.00114 mol of LiA, 0.00342 mol of lithium tert-butoxide, and 5.04 ml of toluene was added under stirring at −40° C. After 5 hours of polymerization, the polymer was obtained in the yield of 33%.

EXAMPLE 15

Similarly as in Example 1, the charge contained 49.2 ml of toluene and 0.0343 of MMA. The initiator prepared from 0.0000343 mol of LiA, 0.000343 mol of sodium tert-butoxide, and 1.76 ml of toluene was added under stirring at −40° C. After 5 hours of polymerization, the polymer was obtained in the yield of 52%.

We claim:

1. A method for preparation of polymers and copolymers based on olefins substituted by polar groups, which are selected from the group comprising ester, nitrile, and aryl groups, or based on dienes, wherein the polymerization, the grafting polymerization, or the copolymerization is initiated by the system formed by mixing of an organic amide of lithium, sodium, or potassium, derived from a primary or secondary amine or polyamine, or from a tertiary polyamine which, however, contains at least one primary or secondary amino group in the molecule, which has its nitrogen atoms bonded with carbon atoms and/or silicon atoms and contains 1 to 2090 carbon atoms and 1 to 1045 nitrogen atoms in the molecule or which has the molecular weight up to 45,000, with an alkoxide of the same or other alkaline metal derived from an alcohol with the straight, branched, or cyclic chain of 3 to 16 carbon atoms, while the polymerization, the grafting polymerization, or the copolymerization is carried out at the molar ratio of the monomer and the organic amide of alkaline metal 5 to 1500 and the molar ratio of the alkaline metal alkoxide and the organic amide of alkaline metal 0.5 to 10 hydrocarbons or ether solvents.

2. The method according to claim 1, wherein the alkaline metal alkoxide or its part is mixed with a monomer or a mixture of monomers before the addition of the organic amide of alkaline metal to the polymerization mixture.

3. The method according to claim 1, wherein a monomer or a mixture of monomers is gradually added in parts to the initiator, i.e. to the system formed by mixing of the organic amide of alkaline metal with the alkaline metal alkoxide.

4. The method according to claim 1, wherein, in the block copolymerization, the second monomer is added into the polymerization mixture first after the first monomer was completely polymerized by the initiation system prepared from the organic amide of alkaline metal and the alkaline metal alkoxide, while the different monomers used have either the same polymerizability or are added in the order corresponding to the increasing polymerizability by anionic initiators.

5. A method for preparation of polymers based on olefins substituted by an ester group or based on dienes, wherein the polymerization is initiated by the system formed by mixing of an organic amide of lithium, sodium or potassium, derived from a secondary amine, which has its nitrogen atoms bonded with carbon atoms and/or silicon atoms and contains 1 to 2090 carbon atoms and 1 to 1045 nitrogen atoms in the molecule or which has a molecular weight up to 45,000, with an alkoxide of the same or other alkaline metal derived from a branched chain alcohol of 3 to 16 carbon atoms, while the polymerization is carried out at the molar ratio of the monomer and the organic amide of alkaline metal 5 to 1500 and the molar ratio of the alkaline metal alkoxide and the organic amide of alkaline metal 0.5 to 10 hydrocarbon or ether solvents.

6. The method according to claim 5, wherein the solution of aforesaid initiators is added at once or gradually in several portions to the solution of a monomer or of a monomer mixture.

7. The method according to claim 5, wherein an aliphatic, cycloaliphatic, or aromatic hydrocarbon, an organic ether, or a mixture thereof is used as the solvent of monomers and initiators.

* * * * *